2,779,798

PROCESS OF PREPARING POUR POINT DEPRESSANTS BY CATALYTIC CONDENSATION OF HALOALKYL ALKYLATED PHENOL ETHER

Joseph J. McBride, Jr., Cranford, N. J., assignor to Tidewater Oil Company, a corporation of Delaware No Drawing. Application June 24, 1953,
Serial No. 363,915

2 Claims. (Cl. 260—612)

The present invention relates to improved mineral oil compositions and to novel reaction products useful as additives for such compositions.

The invention in broad aspect comprises novel reaction products, useful as pour point depressant additives for mineral oils, prepared by catalytic condensation reaction of haloalkyl alkylated phenyl ether products and, particularly, such products in which the phenyl radical is alkylated with an alkyl group of a relatively high number of carbon atoms, such as on the order of about 16 to about 30 or more carbon atoms. Preferably, the ether products embodied for use herein in preparing the novel pour point depressants are haloalkyl (wax)-alkylated phenyl ethers which may be prepared by conventional methods which comprise reacting a (wax)-alkylated phenol with a suitable aliphatic polyhalide (preferably a dihalide) in presence of an alkali or by reacting an alkali with a (wax)-alkylated phenol to convert the phenol to a (wax)-alkylated phenate, followed by reacting the phenate with a suitable aliphatic halide to produce the haloalkyl alkylated phenyl ether product.

As those skilled in the art are aware, certain alkylated phenols, and particularly (wax)-alkylated phenols, possess activity as pour point depressants for mineral oils. In many instances particular alkylated phenols may provide adequate pour point depressing activity whereas in other instances more effective pour point depressing activity is desired than is provided for by the alkylated phenol. Although the invention in broad aspect relates to pour point depressants prepared by condensation reaction of the aforesaid ether products, a specific aspect of the invention relates to preparation of highly effective pour point depressants starting with alkylated phenols and particularly alkylated phenols that, though they may possess pour point depressing activity, are not as effective in that respect as is desired for a particular requirement. The following example illustrates such a specific aspect of the invention.

EXAMPLE

In conventional manner, a (wax)-alkylated phenol was prepared by refluxing at 90–110° C. for about 16 hours a reaction mixture comprising phenol and a dichlorowax (about 18 percent chlorine) in a reactant ratio of 2 moles of dichlorowax to one mol of phenol, and 1½ percent by weight, based on the weight of phenol, of zinc chloride alkylation catalyst. The (wax)-alkylated phenol produced possessed activity as a pour point depressant as 0.5 percent by weight of the (wax)-alkylated phenol depressed the pour point of a 150 Penn Neutral oil from +20° F. to —18/—15° F.

By conventional reaction for preparation of haloalkyl alkylated phenyl ether products, the (wax)-alkylated phenol was reacted with trimethylene bromide in the presence of aqueous sodium hydroxide, the reaction mixture consisting of 50 grams of the wax phenol, 24.6 grams of trimethylene bromide and 50 ccs. of water. The reaction mixture was heated to reflux temperature and a solution of 4 grams of sodium hydroxide in 15 ccs. of water was added over a 15 minute period. The reaction was carried out under reflux conditions for seven hours to produce a reacted mixture comprising an aqueous phase and an organic phase. The latter phase, comprising the bromoalkyl (wax)-alkylated phenyl ether product, was separated from the aqueous phase and dried. The ether product thus obtained possessed activity as a pour point depressant as 0.5 percent thereof dissolved in the 150 Penn Neutral oil produced a composition having a pour point of —10/—5° F., i. e. a pour point lower than the oil itself but not as low as that obtained by use in the same concentration of the (wax)-alkylated phenol from which the ether product was produced.

In accordance with this invention, the bromoalkyl (wax)-alkylated phenyl ether product was heated in presence of 10 percent by weight of fused zinc chloride catalyst at 180° C. for 4½ hours under water aspirator vacuum. Under such conditions, condensation reaction of the ether product occurred with liberation of hydrogen bromide to produce a reacted mixture which, upon being decanted to remove catalyst, yielded an oil-soluble dark-brown condensation product which at room temperature was of semi-solid consistency and had a wax-like appearance. 0.5 percent by weight of the condensation product dissolved in 150 Penn Neutral oil produced a composition that had a pour point of —30° F., i. e. substantially lower than the pour point obtained when the wax phenol or the intermediate ether product from which the condensation product was produced were used in the same concentration in the 150 Penn Neutral oil.

In further illustration of the invention the following additional examples are set forth.

Series I

EXAMPLE A

By a procedure similar to that described hereinbefore for preparation of haloalkyl alkylated phenyl ethers, a (wax)-alkylated phenol (prepared by reacting 2 moles of dichlorowax with one mol of phenol) was reacted with ethylene bromide in presence of aqueous sodium hydroxide in an amount sufficient to convert the (wax)-alkylated phenol to the corresponding sodium phenate and conversion of the latter to a bromoalkyl (wax)-alkylated phenyl ether product. The phenyl ether product was subjected to condensation reaction at 180° C. for 4½ hours in presence of 10 percent by weight of zinc chloride. Following completion of the reaction, the reactant mixture was decanted while at substantially room temperature to remove catalyst. The product of the condensation reaction was dark-brown in color, moderately soluble in 150 Penn Neutral oil and of wax-like appearance and consistency at room temperature. The condensation product, in 0.1 percent by weight solution in 150 Penn Neutral oil, was an effective pour point depressant as is apparent from the following tabulation which, for comparative purposes, includes the pour point characteristics of the 150 Penn Neutral oil itself as well as that oil containing the (wax)-alkylated phenol from which the condensation product of this example was prepared.

| | A. S. T. M. pour point, ° F. |
|---|---|
| 150 Penn Neutral oil | +20 |
| 0.1 percent by weight of the (wax)-alkylated phenol dissolved in 150 Penn Neutral oil | —2/—0 |
| 0.1 percent by weight of the condensation product dissolved in 150 Penn Neutral oil | —22/—20 |

EXAMPLE B

Same as Example A except that the condensation reaction was carried out in the presence of 10 percent of aluminum chloride. 0.1 percent by weight of the resulting condensation product (dark-brown, substantially solid) dissolved in the 150 Penn Neutral oil lowered the pour point of the oil to −20/−15° F.

EXAMPLE C

Same as Example B except that the condensation reaction was carried out at 100° C. 0.1 percent by weight of the resulting condensation product dissolved in the 150 Penn Neutral oil lowered the pour pont thereof to −30/−25° F.

EXAMPLE D

Same as Example A except that the condensation reaction was carried out using 3 percent of zinc chloride in one case and 3 percent of aluminum chloride in another, with both reactions being carried out at 180° C. 0.1 percent by weight of the condensation products dissolved in 150 Penn Neutral oil lowered the pour point thereof from +20° F. to −15/−10° F.

Series II

EXAMPLE E

A (wax)-alkylated phenol, such as used in Example A, was reacted with trimethylene bromide in presence of aqueous sodium hydroxide to convert the alkylated phenol to the corresponding bromoalkyl (wax)-alkylated phenyl ether product. The ether product was then subjected to condensation reaction at 180° C. for 4½ hours in presence of 3 percent by weight of aluminum chloride. The condensation product was an effective pour point depressant as shown by the following comparative data.

A. S. T. M. pour point, ° F.

| | |
|---|---|
| 150 Penn Neutral oil | +20 |
| 0.1 percent by weight of the (wax)-alkylated phenol dissolved in 150 Penn Neutral oil | −2/−0 |
| 0.1 percent by weight of the condensation product of this example dissolved in 150 Penn Neutral oil | −30/−25 |

EXAMPLE F

Same as Example E except that the condensation was carried out at 100° C. 0.1 percent by weight of the resulting substantially solid condensation product dissolved in 150 Penn Neutral oil provided a composition having a pour point of −20/−15° F.

EXAMPLE G

Same as Example E except that 5 percent of aluminum chloride was used for the condensation reaction. 150 Penn Neutral oil containing, in solution, 0.1 percent by weight of the condensation product of this example had a pour point of −25/−20° F.

EXAMPLE H

Same as Example E except that 5 percent of zinc chloride was used as the catalyst in the condensation reaction. 150 Penn Neutral oil containing, in solution, 0.1 percent by weight of the condensation product (dark-brown, substantially solid) had a pour point of −20/−15° F.

Series III

EXAMPLE I

Another (wax)-alkylated phenol, prepared in the manner described in Example A, by reacting two moles of dichlorowax with one mol of phenol, was reacted with a commercial mixture of dichlorinated pentanes in presence of aqueous sodium hydroxide in an amount sufficient to convert the alkylated phenol to a chloroalkyl (wax)-alkylated phenyl ether product. The ether product was then subjected to condensation reaction in the presence of 3 percent by weight of aluminum chloride. The reaction was carried out at 100° C. for 4½ hours during which evolution of hydrogen chloride occurred. The effectiveness as a pour point depressant of the condensation product obtained is apparent from the following.

A. S. T. M. pour point, ° F.

| | |
|---|---|
| 150 Penn Neutral oil | +20 |
| 0.5 percent by weight of the (wax)-alkylated phenol dissolved in 150 Penn Neutral oil | −35/−30 |
| 0.5 percent by weight of the condensation product of this example dissolved in 150 Penn Neutral oil | below −40 |

With reference to the condensation reaction of the aforesaid ether products, the reaction is carried out in the presence of a condensation catalyst, suitable illustrations of which are the Friedel-Crafts type and specific examples of which include aluminum chloride, zinc chloride, boron fluoride, ferric chloride, and the like. As is apparent from the examples set forth hereinbefore, the condensation reaction can be suitably carried out over a rather wide temperature range. Preferably an elevated temperature of from 100° to 200° C. is employed, although use of somewhat lower temperatures than 100° C., such as down to about 50° C., are contemplated. In general the temperature employed is correlated with the time of reaction, the particular catalyst and amount thereof employed. Use of a temperature in the lower region of the aforesaid range of about 50° C. to about 200° C., may merit consideration when extended reaction time is not particularly objectionable and/or a strong condensation catalyst is employed. In contemplated use of temperatures in the upper region of the aforesaid range, consideration should be given to use of a temperature that does not enhance formation of substantial amounts of oil-insoluble condensation products. The condensation reaction may be suitably carried out over a rather wide range of time and generally a longer reaction time is used as the reaction temperature is lowered and/or a weak condensation is used. Thus, the reaction time may be varied from a fraction of an hour, such for example as about one-half hour when use is made of relatively high reaction temperatures and highly active condensation catalyst are employed, to about twelve hours when use is made of relatively low reaction temperatures and/or weak catalyst are used. The amount of catalyst employed may be a relatively low or relatively high amount, based on the weight of the phenyl ether product used for the condensation reaction. As shown by the specific examples set forth hereinbefore, use of the catalyst in amounts of 3 percent, 5 percent and 10 percent produced condensation products that functioned as highly effective pour point depressants. Although it is not intended that the invention be limited thereto, the amount of catalyst used may be varied within the range of about 1 percent to about 50 percent or higher, based on the weight of the phenyl ether reactant, although in most instances amounts on the order of from about 2 percent to about 12 percent are suitable.

In the foregoing specific examples, and following completion of the condensation reaction, the desired condensation reaction product was recovered by decanting the reacted mixture to remove catalyst and highly resinous (sludge) material, if any, formed during the reaction. On the other hand, other methods may be used for catalyst removal, an example of which comprises neutralizing or hydrolyzing the catalyst and removal thereof from the reacted mixture in conventional manner.

As is apparent from the foregoing, the oil-soluble condensation products embodied herein have effective pour point depressing properties for mineral oils, and particularly waxy mineral oils, when added thereto in relatively small amounts. Although specific amounts of 0.1 and 0.5 percent by weight of the novel pour point depressants were used in the illustrative examples, it should be understood that the invention is not limited thereto. Smaller and larger amounts than those specifically set forth may be used depending on the particular oil compositions into which the condensation product is incorporated, solubility characteristics of the pour point depressants, the degree to which it is desired to depress the pour point, etc. Thus, although amounts in the range of about 0.01 to about 3 percent, based on the weight of oil is contemplated, amounts ranging from about 0.1 to about 1.0 percent are suitable for most purposes.

As to the specific aspect of this invention pertaining to the conversion of alkylated phenols to more effective pour point depressants, various alkylated phenols and preferably (wax)-alkylated phenols are contemplated. Preferred are the (wax)-alkylated phenols prepared by alkylation reaction between a dihalowax (e. g. dichlorowax) and phenol using a reaction mixture comprising a ratio of one mol of phenol to two or more moles of dichlorowax as, from the (wax)-alkylated phenols thus produced, highly effective pour point depressants are obtained by conversion thereof to phenyl ether products and subjecting the ether products to condensation reaction.

As is the case with many products of condensation reactions, the exact structure of the condensation products embodied herein are not known. Depending on the particular reaction conditions employed, the particular phenyl ether product subjected to the condensation reaction, etc., the condensation products may vary somewhat in certain characteristics but, in general, they are dark-colored, high molecular weight materials that may range in consistency from that of viscous oils to solid or semi-solid substances of wax-like appearance. As set forth hereinbefore, the condensation reaction is carried out under conditions whereby hydrogen halide is liberated and the resulting condensation products are substantially halogen-free and soluble in mineral oils in amounts sufficient to effect pour point depression although, here again, condensation reactions of the type embodied herein are often difficult to carry out to such an extent that complete removal of the halogen, present in the phenyl ether reactant, is effected. Thus, embodied herein are condensation products that may contain a relatively small amount of halogen and which does not substantially, if at all, deleteriously effect the pour point depressing property of the condensation product.

Although the present invention has been described in conjunction with certain preferred embodiments thereof, those skilled in the art will readily recognize that variations and modifications can be made. Such modifications and variations are to be considered to be within the purview of the specification and scope of the appended claims.

I claim:

1. The process which comprises reacting one mol of a phenol with at least two mols of a dihalowax, subjecting the resulting haloalkyl (wax)-alkylated phenyl ether to condensation reaction in presence of a Friedel-Crafts catalyst at a temperature of about 50° C. to about 200° C. and for about one-half hour to about 12 hours to produce a reaction mixture containing a high molecular weight oil-soluble condensation product having the property of depressing the pour point of mineral oils when dissolved therein in small amounts, and recovering said condensation product from said reaction mixture.

2. The process which comprises (1) converting to its corresponding haloalkyl (wax)-alkylated phenyl ether product a pour point depressing (wax)-alkylated phenol prepared by reaction of a phenol with a dihalowax using a reaction ratio of one mol of phenol to at least two moles of dihalowax, subjecting said phenyl ether product to condensation reaction in presence of a Friedel-Crafts catalyst to produce a reaction mixture containing a high molecular weight oil-soluble condensation product that is a more effective pour point depressant for said oils than said (wax)-alkylated phenol when dissolved in said oils in small amounts, and recovering said high molecular weight condensation product from said reaction mixture.

References Cited in the file of this patent

UNITED STATES PATENTS

| 2,114,812 | Reiff et al. | Apr. 19, 1938 |
| 2,111,769 | Graves | Mar. 22, 1938 |
| 2,186,367 | Coleman et al. | Jan. 9, 1940 |
| 2,239,515 | Bartlett | Apr. 22, 1941 |

FOREIGN PATENTS

| 474,240 | Great Britain | Oct. 27, 1937 |

OTHER REFERENCES

Thomas: "Anhydrous Aluminum Chloride in Organic Chemistry" (1941), pages 815–819, pub. by Reinhold Pub. Corp., New York.